(12) United States Patent
Chiodini

(10) Patent No.: US 9,439,221 B2
(45) Date of Patent: Sep. 6, 2016

(54) METHOD FOR MANAGING ACCESS TO A SHARED COMMUNICATION MEDIUM

(75) Inventor: Alain Chiodini, Boulogne-Billancourt (FR)

(73) Assignee: Sagem Defense Securite, Boulogne-Billancourt (FR)

( * ) Notice: Subject to any disclaimer, the term of this patent is extended or adjusted under 35 U.S.C. 154(b) by 128 days.

(21) Appl. No.: 14/236,394

(22) PCT Filed: Aug. 1, 2012

(86) PCT No.: PCT/EP2012/065000
§ 371 (c)(1),
(2), (4) Date: Apr. 25, 2014

(87) PCT Pub. No.: WO2013/017614
PCT Pub. Date: Feb. 7, 2013

(65) Prior Publication Data
US 2014/0233555 A1    Aug. 21, 2014

(30) Foreign Application Priority Data

Aug. 3, 2011   (FR) ..................................... 11 57115

(51) Int. Cl.
*H04W 74/08* (2009.01)
(52) U.S. Cl.
CPC ................................ *H04W 74/0816* (2013.01)
(58) Field of Classification Search
None
See application file for complete search history.

(56) References Cited

U.S. PATENT DOCUMENTS

| | | | |
|---|---|---|---|
| 5,502,724 A * | 3/1996 | Chen ..................... | H04L 12/413 370/445 |
| 2001/0033579 A1* | 10/2001 | Nelson, Jr. ............ | H04L 1/1607 370/447 |
| 2004/0031856 A1* | 2/2004 | Atsmon .................. | G06F 21/34 235/492 |
| 2005/0118946 A1* | 6/2005 | Colban ............... | H04L 12/1881 455/3.06 |
| 2006/0109859 A1* | 5/2006 | Acharya ........... | H04W 74/0816 370/445 |
| 2006/0247736 A1* | 11/2006 | Roberts .............. | A61N 1/37276 607/60 |
| 2010/0008347 A1* | 1/2010 | Qin ....................... | H04W 74/04 370/345 |

* cited by examiner

*Primary Examiner* — Dung B Huynh
(74) *Attorney, Agent, or Firm* — Bachman & LaPointe, P.C.

(57) ABSTRACT

The methods for managing access to a communication medium shared by a plurality of radio communication devices. The method of accessing a radio communication medium shared between a plurality of communication terminals. The method is based on a variant of the CSMA/CD access protocol. The method is based on monitoring of the medium and the emission of a token to request permission to emit. The terminals that receive this token then emit an acknowledgement intended to signal that the medium can be used, or a collision message if they receive a plurality of tokens simultaneously. In the latter case, the emitter retries its attempt to use the medium later on.

6 Claims, 3 Drawing Sheets

METHOD FOR MANAGING ACCESS TO A SHARED COMMUNICATION MEDIUM

BACKGROUND

The present invention concerns the field of methods for managing access to a shared communication medium by a plurality of radio communication devices.

The invention is situated in the context of radio communication systems of the TDMA (Time Division Multiple Access) type.

The system is TDMA in that the time is divided into frames used for communication. Each frame is itself divided into elementary time intervals, called time slots, for communication. This communication is also multi-frequency, meaning the system can communicate on a plurality of frequencies. The transmission channel can therefore be seen as an arrangement with two dimensions, a time dimension and a frequency dimension, which defines elementary communication units (slots) corresponding to a time slot and frequency pair enabling communication.

Typically, although this is not always the case, the system is semi-duplex in that communication from base to handset, referred to as downlink communication, and communication from handset to base, referred to as uplink communication, are not simultaneous, but distributed over different time slots. Typically, the frame is divided into two parts, one part dedicated to downlink traffic and one part dedicated to uplink traffic.

FIG. 1 illustrates the structure of the frame in the example embodiment of the invention. The frame 1.1 is divided into a first part 1.2 dedicated to the downlink traffic sent by the base to the handsets, and a second part 1.3 dedicated to the uplink traffic from the handsets to the base. It is expressed along the time axis 1.4 and the frequency axis 1.5. It defines elementary communication units 1.6 defined by a given frequency and with a duration equivalent to an elementary time slot. The duration of the frame is, in the example embodiment, around 10 ms, divided into twice 12 elementary time slots. This frame is repeated periodically.

The communication system that is the context of the invention also has a broadcast channel. This broadcast channel is a communication medium shared by a plurality of communication terminals. Each terminal is allowed to send over this shared channel messages or data intended for all the terminals accessing the broadcast channel. This broadcast channel is implemented in the form of at least one elementary communication unit 1.7 in the frame. In some embodiments, the broadcast channel consists of a pair of corresponding elementary communication units 1.7 and 1.8 in each half-frame. One of the units is then used by the terminal for sending data, the other one is used for reception according to the scheme of the frame. The channel may also consist of a plurality of units if needed.

Since the broadcast channel is shared between the terminals, it may happen that several terminals decide to send over this channel at the same moment and that collisions occur preventing the reception of the data. It is therefore necessary to provide a method for managing collisions in this system.

SUMMARY

The invention aims to solve the aforementioned problems thanks to a method for accessing a radio communication medium shared between a plurality of communication terminals. This method is based on a variant of the CSMA/CD (Carrier Sense Multiple Access/Collision Detection) access protocol. This method is based on listening to the medium and sending a token for requesting authorisation to send. The terminals that receive this token then send an acknowledgement aiming at allowing the medium to be taken up, or a collision message if they receive several tokens simultaneously. In the latter case, the sender postpones its attempt to take up the medium.

The invention concerns a method for accessing a radio communication medium shared between a plurality of communication terminals, which comprises the following steps by a terminal wishing to send data intended for other terminals: a step of listening to the medium; if the medium is free, a step of sending a token over the medium; a step of receiving a response sent by receivers that receive this token; a step of waiting and listening to the medium if the response is a collision message indicating that several terminals have sent a token and a step of sending data if the response received is an acknowledgement.

According to a particular embodiment of the invention, said medium being defined by a dedicated frequency space-time in a TDMA frame, the step of listening to the medium is performed during a first time slot; if the medium is free during this first time slot, the step of sending a token on the medium then occurs during a second time slot; the step of receiving a response sent by the receivers that receive this token occurs during the following time slot.

According to a particular embodiment of the invention, the step of sending data occurs also in the absence of reception of a response by the terminal that sent a token.

According to a particular embodiment of the invention, the broadcast channel being divided into segments associated with each type of message, the step of sending or receiving a message is performed in the associated segment.

According to a particular embodiment of the invention, the messages exchanged consist of a pure sinusoid.

According to a particular embodiment of the invention, the method further comprises: a step of pairing the successive time slots constituting the broadcast medium; a step of splitting all the terminals into two subsets, a first subset of terminals referred to as greeted where the paired successive slots are such that the first one is dedicated to sending and a second subset of terminals referred to as greeter where the paired successive slots are such that the first one is dedicated to receiving, and a step where, prior to sending data by a greeter terminal, the latter and all the greeted terminals switch and change greeter-greeted status.

According to a particular embodiment of the invention, the step of sending data is spread over several time slots.

The invention also concerns a terminal accessing a radio communication medium shared between a plurality of communication terminals, said terminals wishing to send data intended for the other terminals which comprises: means for listening to the medium; if the medium is free, means for sending a token over this medium; means for receiving a response sent by the receivers that received this token; means for waiting and listening to the medium if the response is a collision message indicating that several terminals have sent a token and means for sending data if the received response is an acknowledgement.

BRIEF DESCRIPTION OF THE DRAWINGS

The features of the invention mentioned above, as well as others, will emerge more clearly from a reading of the following description of an example embodiment, said description being given in relation to the accompanying drawings, among which:

FIG. 6 illustrates the take-up of the broadcast channel by a greeter terminal according to an example embodiment of the invention.

FIG. 7 illustrates the take-up of the broadcast channel by a greeter terminal according to an example embodiment of the invention with a prior collision.

DETAILED DESCRIPTION

A set of terminals shares the use of the TDMA frame as described in the preamble. These terminals therefore share access to the broadcast channel that is inserted therein. This broadcast channel is therefore characterised by a time and frequency slot that can be used by all the terminals for sending data to all the other terminals. When a terminal does not have data to send over this channel, it listens thereto in order to be able to receive the data sent by the other terminals on this channel. Typically the systems according to the invention do not allow sending data and simultaneous listening by the same terminal during the same time slot.

If several terminals send data at the same time over the broadcast channel, the result is that these transmissions mutually jam each other and therefore cannot be received correctly by the various destinations.

The use of algorithms of the CSMA/CD type on broadcast mediums of the Ethernet type for example is known. Unlike the systems envisaged, the systems implementing methods of the CSMA/CD type have a broadcast medium available over time and the terminals using this medium can themselves detect a collision occurring when sending data. Typically these systems listen permanently to the medium and decide to send data when the medium has been free for a given time. If a collision occurs during this sending, the sender perceives such, since it does not receive the data that it has sent itself. It then waits for a given time and makes a further sending attempt.

This method cannot be used in the context of the systems according to the invention. First, it is not possible to listen and send at the same time, and therefore to detect the fact that one transmission has come into collision with another. Secondly, the medium is not available continuously, but only during a specific time slot in a time frame being reproduced periodically.

Figure 1:
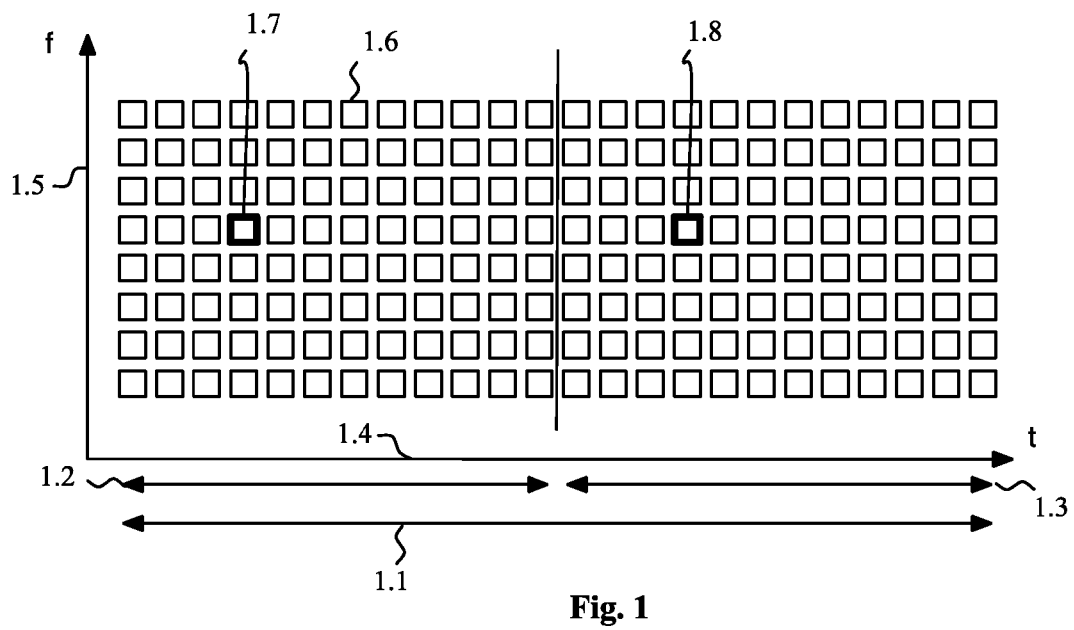
FIG. 1 illustrates the structure of a TDMA frame according to an example embodiment of the invention.
Figure 2:
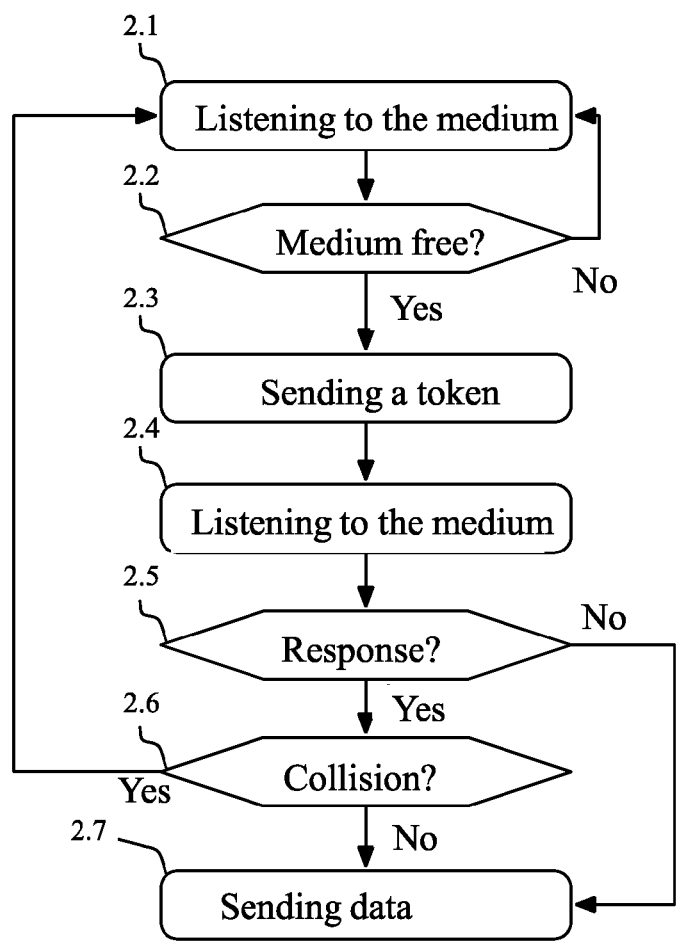
FIG. 2 illustrates the general algorithm of an example embodiment of the method for accessing the broadcast medium.

According to the invention, all the terminals listen to the broadcast channel. When a terminal wishes to send data, it then proceeds according to the method described in FIG. 2. During a first step 2.1, it listens to the medium during a time slot, like all the terminals. It detects whether the medium is free, step 2.2, or whether another terminal has sent data during this time slot. If the medium is not free, it waits to send and remains in a state of listening to the medium 2.1. Advantageously, it prepares to listen to the data sent by the other terminal that preceded it. "Following time slot" means the time slot corresponding to the broadcast channel for the following frame or for the following half frame if the broadcast channel is implemented by a time slot during each half frame. If the medium is free then, during the following time slot, the terminal sends a token to request access to the broadcast channel; this is step 2.3.

During the time slot following the sending of its token, it once again listens to the medium; this is step 2.4. It is necessary in fact for it to determine whether its token is indeed transmitted to the other terminals without collision. It then determines whether it receives a response to the token that it has sent; this is step 2.5. In the case where no response is received, it is deduced therefrom that a priori no terminal is within range and therefore in a position to receive the data that was sent thereto. It is then still possible to choose to send our data or not; this is an arbitrary implementation choice. According to the example embodiment in FIG. 2, the data are then sent during step 2.7.

In the case where at least one response is received, it is necessary to determine whether or not there has been a collision during our sending of the token. For this purpose, the terminals that receive the token respond according to the number of tokens that they have received. In the case where they have received only one token, they respond by an acknowledgement. In the case where they receive several tokens, even if they are not in a position to count the tokens received and to determine the exact number thereof, they respond by a collision message. The terminal that sent the token therefore, during step 2.6, analyses the responses received in order to determine whether there has been a collision. If it has received at least one collision message, then it waits for a given time in order to make a further attempt; it therefore goes to step 2.1 again. If only acknowledgements are received, the terminal can then send its data during step 2.7.

Figure 3:
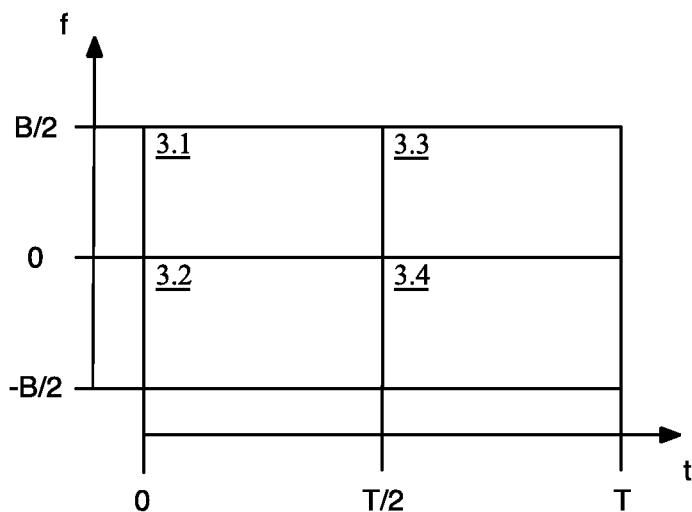
FIG. 3 illustrates the division of the broadcast channel according to an example embodiment of the invention.

Advantageously, the medium associated with the broadcast channel, which consists of a frequency space-time, is divided into segments associated with each type of message exchanged. This division can be made time-wise or frequency-wise or mingle a frequency and time division. FIG. 3 illustrates an example of such a division. According to this example, the medium associated with the broadcast channel has a time duration of T and a frequency band of B. This medium is divided into four segments 3.1, 3.2, 3.3 and 3.4. Segment 3.1 ([0, T/2], [0, B/2]) serves to convey the tokens. Segment 3.2 ([0, T/2], [−B/2, 0]) serves to convey the acknowledgements. Segment 3.3 ([T/2, T], [0, B/2]) serves to convey the collision messages. Segment 3.4 ([T/2, T], [−B/2, 0]) serves to convey the acknowledgements for the data traffic. The data messages, for what they are concerned, use all the medium. It will be understood that this distribution is a non-limitative example and that the distribution may be different. Dividing the broadcast medium in this way by segments facilitates discrimination of the various types of message.

The token may consist of modulated binary sequences having, for example, the same spectral width as the speech packets or data packets exchanged.

Advantageously, the signals are composed of a pure sinusoid the duration of which is less than T/2, where T is the duration of the time slot associated with the broadcast medium. The frequency of this sinusoid is chosen in the frequency slot building the broadcast medium. Advantageously, this frequency is included in the band defining the segment when the medium is divided.

Figure 4A:
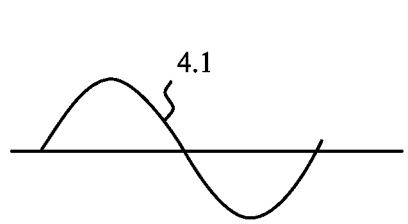
FIG. 4 illustrates the structure of the token according to an example embodiment of the invention.
Figure 4B:
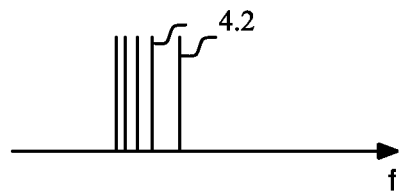

FIG. 4a illustrates such a sinusoid 4.1 used as a signal, for example as a token. FIG. 4b illustrates a set of such tokens as received by a terminal and represented in the frequency space. It is seen that, each sinusoid being pure, it is represented by a peak 4.2 in the frequency space. These peaks are slightly offset one from another, because of the frequency drifts naturally affecting the radios of the various nodes in the network.

The use of such pure sinusoids as a signal is advantageous in more than one way.

This affords an increase in the range of the signal because the power spectral density is high on an extremely small frequency space. These signals are received with a high signal to noise ratio and detection thereof is thus facilitated.

These sinusoids can be received on the same medium without interfering with one another, because of the frequency drifts naturally affecting the radios of the various nodes in the network. They may thus assist with the acquisition and maintenance of the synchronisation of the receivers.

In addition, if the terminals are static or move at low speed, the propagation channel does not affect the characteristics of the sinusoidal tokens, except for their amplitude, so that it is not necessary to equalise them at the time of processing thereof.

Advantageously, it is possible to count them. Thus the sender of a token is in a position to count the messages received in return and therefore to thus assess the size of the network. Knowing, at least approximately, the number of terminals in the network may enable it for example to determine the size of the contention window. The higher the number of terminals, the greater the contention window size. This window is the window in which there is randomly drawn the moment of a new test for sending a token in the event of collision.

Figure 5:
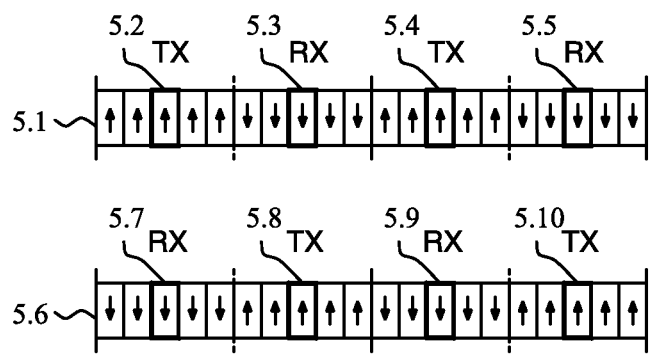
FIG. 5 illustrates the pairing of the time slots constituting the broadcast channel.

Hereinafter, the successive time slots constituting the broadcast medium will be paired. This is illustrated by FIG. 5. This figure shows two successive frames for two cases. The first case, 5.1, illustrates a first frame consisting of two half frames, the first being dedicated to sending (TX) and the second to reception (RX). Each half frame contains a time slot, 5.2 and 5.3, reserved for the broadcast channel. In this case, the broadcast channel is used alternately in sending and receiving in accordance with the frame mode. "Frame mode" means the order of the half frames, i.e. according to a first frame mode the first half frame is dedicated to sending and the second one to receiving. In a second frame mode, the first half frame is dedicated to reception and the second to sending.

It can therefore be seen that, in FIG. 5, the frames 5.1 are in the first frame mode and the frames 5.6 in the second frame mode. In accordance with this, the broadcast channel slots 5.2, 5.4, 5.8 and 5.10 are reserved for sending, while the slots 5.3, 5.5, 5.7 and 5.9 are devoted to receiving.

Alternately, when a single slot is dedicated to the broadcast medium in the frame, two successive slots can be paired in a similar fashion and a frame mode attributed to them in order to determine which of the two slots is dedicated to sending and which one is dedicated to receiving.

A terminal is said to be greeted if the paired successive slots are such that the first is dedicated to sending. A terminal is said to be greeter if the paired successive slots are such that the first one is dedicated to reception.

According to a particular embodiment of the invention, all the terminals are divided into two subsets. A first subset consists of greeted terminals while the second consists of greeter terminals. The aim is that, at a given instant, only the greeter terminals are allowed to send over the broadcast channel. The distribution of the terminals in the two subsets is arbitrary. Advantageously, this distribution ensures that the two subsets are substantially equivalent in number. For example, a random drawing when the terminal is started up can allocate thereto the characteristic of greeted or greeter. In the example embodiment based on the DECT system, it is possible to distribute the terminals in one group or the other according to the clarity of their temporary identification number, referred to as TPUI.

Advantageously, to enable all the terminals to be able to send, it is possible either to alternate the status of each terminal or to randomly obtain a new status periodically. Status of the terminal means here being greeted or greeter.

Figures 6, 7:
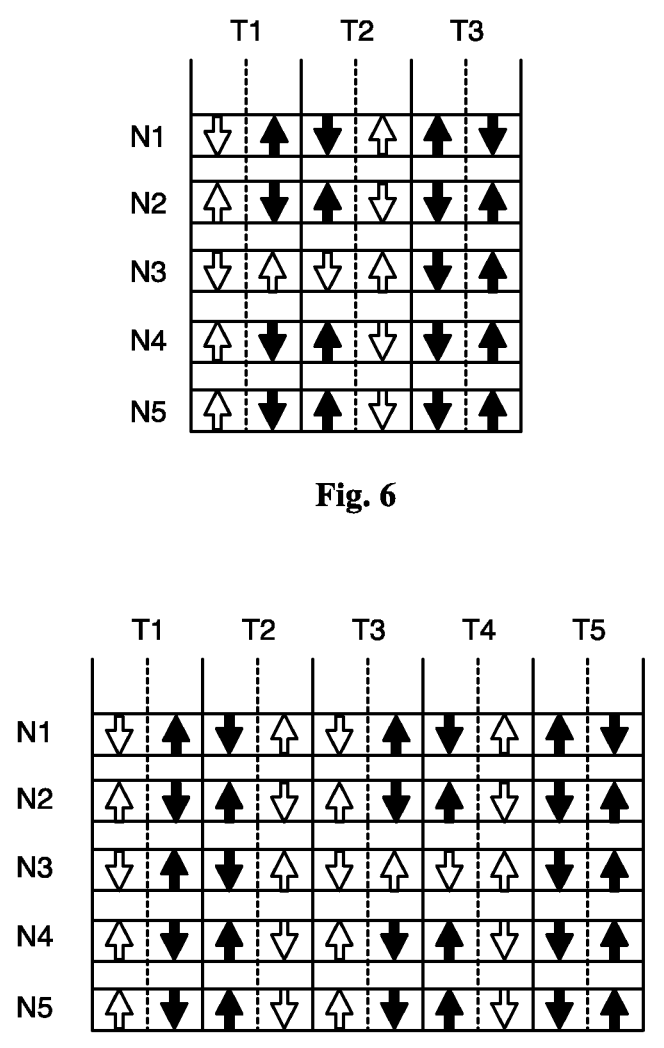

The take-up of the broadcast channel by a greeter terminal is described in relation to FIG. 6. An upward arrow illustrates sending, a downward arrow illustrates receiving. When the arrow is solid, this illustrates a sending or reception of data; when it is empty, no data item is in fact transmitted. The terminals are numbered from N1 to N5. The figure illustrates three frames numbered T1 to T3. The terminals N1 and N3 are greeter terminals because the first half frame is dedicated to receiving for them. The terminals N2, N4 and N5 are greeted terminals because the first half frame is dedicated to sending for them.

During a first step, the greeter terminals listen to the medium; this occurs during the first half frame of T1. In this embodiment, the time slot timing the steps consists of the half frames. Only N1 wishes to send data. Not detecting any traffic during the first half frame, N1 therefore sends a token during the second half frame of T1. This token is received by the greeted terminals N2, N4 and N5. The greeter terminal N5 does not receive the token from N1 because it is positioned in sending during this half frame; it is therefore not warned of the intention of N1 to use the channel.

During the first half frame of the second frame T2, the greeted terminals that receive the token from N1 send an acknowledgement that is received by N1. N3 does not participate in the communication. N1, receiving acknowledgements and no collision message, knows that it can use the broadcast channel to send its data during the following frame, frame T3. Likewise, the greeted terminals N2, N4 and N5 know that N1 will use the channel since it was the only one to have sent a token. Then all these terminals switch and change greeter-greeted status, except for N3, which is not informed. Taking up the channel implies that the greeter terminal that obtained the channel and all the greeted terminals change status. Thus, during the following first half frame, N1 is the only terminal positioned in sending and it can therefore send its data. All the other terminals are positioned in receiving, even the greeter terminals that were not warned of N1 taking up the channel. The data sent by N1 are therefore indeed broadcast to all the terminals.

Advantageously, these terminals send an acknowledgement during the second half frame of T3 in order to indicate to N1 correct reception of the data.

The terminals then resume their initial status. According to a particular embodiment, this moment is used to reconduct a random drawing of the statuses of the various terminals.

Advantageously, if the quantity of data that N1 must send is large, it is possible to have several frames having the same scheme as T3 that follow each other. During each of these frames, N1 sends data to the other terminals. The data-sending step is then spread over several time slots. Advantageously, these data are acknowledged during the second half frame. Alternately, a second acknowledgement takes place when all the data have been transmitted.

FIG. 7 illustrates the situation when several greeter terminals, here terminals N1 and N3, wish to send data and a collision occurs. After a listening step during the first half frame of T1, N1 and N3 send a token during the second half frame of T1. The result is that each of the greeted terminals N2, N4 and N5 sends a collision signal, rather than an acknowledgement, during the first half frame of T2. These collision signals are received by the greeter terminals N1 and N3. These terminals then draw a random waiting value in a contention window. It is assumed here that N1 obtains the right to re-attempt taking up the channel at the same time while N3 waits for a few frames. Because of this, frames T3, T4 and T5 assume the diagram of frames T1, T2 and T3 of FIG. 6 again and illustrates the channel take-up by N1.

This embodiment where each terminal draws by chance the status in which it is about to be reduces collisions by decreasing the number of terminals that can have access to the channel at a given time. This decrease takes place at the cost of additional delays.

According to a particular embodiment, the acknowledgements are omitted. In this case, a terminal that has sent a token considers that it can send in the absence of reception of any collision signal.

A person skilled in the art will understand that the various variants disclosed may be combined. In particular, it is possible to combine the embodiment based on greeted and greeter terminals with a signal formed by a pure sinusoid. These two embodiments can also be combined with the division of the broadcast channel into segments.

According to an alternative embodiment of the invention, the same method is applied in a non-TDMA radio communication system. If we take for example the case of a WiFi system, we no longer have a periodic time frequency resource. In this embodiment, the terminals being initially listening to the medium, the invention operates according to the flow diagram in FIG. 2 as described below.

During step 2.1, the terminal listens to the medium. Unlike the first embodiment, such listening is not constrained in a given time slot but it is the default mode in which the terminal is set when it has no data to send.

When it wishes to send data, the terminal determines whether the medium that it listens to is free; this is step 2.2.

If the medium is free, it sends a token during a step 2.3. The moment of sending of the token is free and non-constrained by the frame as in the first embodiment.

As soon as the token is sent, it goes into listening mode again in order to await a response; this is step 2.4.

The terminals receiving such a token will reply thereto. They will determine whether there is a collision. The collision is defined a little differently compared with the first embodiment. A collision state is determined when two tokens are sent at instants such that they overlap in time. This overlap may be total or partial. In the contrary case, when the token is received entirely by the receiving terminal without overlap, a response is sent in the form of an acknowledgement. If an overlap, even partial, is detected, the receiving terminal sends a collision signal.

The sending terminal then awaits a response during step 2.5. It then tests whether the received response is a collision signal during step 2.6. If such is the case, it once again switches into listening mode at step 2.1. Otherwise it sends its data during step 2.7.

It can therefore be noticed that, even in the absence of a periodic frame, the invention can also be applied to other radio systems, such as for example WiFi.

Advantageously, this embodiment can be combined with tokens implemented in the form of sinusoidal signals and other advantageous features of the first embodiment.

Only the embodiment based on a distribution of the terminals into greeter and greeted terminals cannot be combined with this second embodiment.

The invention claimed is:

1. A method for a communication terminal configured to send data over a broadcast channel of a radio communication medium shared between a plurality of communication terminals to access said broadcast channel and send said data to said plurality of communication terminals, said communication terminals performing the following steps comprising:

a step of listening to the broadcast channel of the radio communication medium in order to determine whether said broadcast channel is free;

a step of sending a token over said broadcast channel being performed when said step of listening determines that said broadcast channel is free;

a step of receiving over said broadcast channel at least one response, if any, to the sent token from a communication terminal sharing said radio communication medium; and;

a step of determining whether said received response is a collision message indicating that the communication terminal that has sent the response has received several tokens from at least two communication terminals; if said at least one response is a collision message, a step of waiting before restarting the listening step, otherwise; a step of sending the data to be sent over the broadcast channel of the radio communication medium; wherein said broadcast channel is divided into segments associated with each type of message, wherein the step of sending a token or the step of receiving a response to said sent token is performed in the segment with said token or said response;

a step of pairing successive time slots constituting the broadcast channel into two sets of paired successive time slots;

a step of splitting all the terminals into two subsets, a first subset of terminals referred to as greeted terminals where the first set of the paired successive time slots one is dedicated to sending and a second subset of terminals referred to as greeter terminals where the second pair of paired successive time slots is dedicated to receiving; and, prior to performing the step of sending data to be sent over the broadcast channel a greeter terminal, and all the greeted terminals switch and change their greeter-greeted status.

2. The method according to claim 1, said radio communication medium being defined by a dedicated frequency space-time in a TDMA frame, wherein:

the step of listening to the broadcast channel is performed during a first time slot of said radio communication medium;

the step of sending a token over the radio communication medium is performed during a second time slot; and the step of receiving the at least one response to the sent token occurs during the time slot following said second time slot.

3. The method according to claim 2, wherein the step of sending the data to be sent over the broadcast channel is spread over several time slots.

4. The method according to claim 1, further comprising the step of sending the data to be sent over the broadcast channel that is performed when no response to the sent token has been received over the broadcast channel.

5. The method according to claim 1, wherein any token and/or any response thereto consists of a pure sinusoid.

6. A terminal adapted to access to a broadcast of a radio communication medium shared between a plurality of communication terminals in order to send data said broadcast channel of the radio communication medium to said plurality of communication terminals, wherein said terminal comprises:
 circuitry for listening to the broadcast channel of the radio communication medium in order to determine whether said broadcast channel is free;
 circuitry for sending a token over the broadcast channel when the broadcast channel is determined as being free;
 circuitry for receiving over the broadcast channel at least one response, if any, to the sent token from communication terminal sharing said broadcast channel, and
 circuitry for determining whether a received response is a collision message indicating that the communication terminal that has sent the response has received several tokens from a number of communication terminals;
 circuitry for waiting before listening to the broadcast channel when said at least one received response is a collision message;
 circuitry for sending the data to be sent over the broadcast channel of the radio communication medium, when each received response is not a collision message;
 circuitry for pairing successive time slots constituting the broadcast channel into two sets of paired successive time slots; and
 circuitry for splitting all the terminals into two subsets, a first subset of terminals referred to as greeted terminals where the first set of the paired successive time slots one is dedicated to sending and a second subset of terminals referred to as greeter terminals where the second pair of paired successive time slots is dedicated to receiving; and,
 prior to performing the step of sending data to be sent over the broadcast channel a greeter terminal, and all the greeted terminals switch and change their greeter-greeted status;
 wherein said broadcast channel is divided into segments associated with each type of message, wherein the step of sending a token or the step of receiving a response to said sent token is performed in the segment with said token or said response.

* * * * *